US009218219B2

(12) United States Patent
Brownlow et al.

(10) Patent No.: US 9,218,219 B2
(45) Date of Patent: Dec. 22, 2015

(54) MANAGING VIRTUAL FUNCTIONS OF AN INPUT/OUTPUT ADAPTER

(75) Inventors: Sean T. Brownlow, Rochester, MN (US); John R. Oberly, III, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 742 days.

(21) Appl. No.: 12/953,964

(22) Filed: Nov. 24, 2010

(65) Prior Publication Data

US 2012/0131590 A1 May 24, 2012

(51) Int. Cl.
*G06F 9/455* (2006.01)
*G06F 9/50* (2006.01)

(52) U.S. Cl.
CPC .......... *G06F 9/5077* (2013.01); *G06F 9/45558* (2013.01); *G06F 2009/45579* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 6,760,774 | B1 * | 7/2004 | Soumiya et al. | 709/233 |
| 2005/0141423 | A1 * | 6/2005 | Lee et al. | 370/232 |
| 2006/0193327 | A1 * | 8/2006 | Arndt et al. | 370/395.21 |
| 2006/0212620 | A1 * | 9/2006 | Arndt et al. | 710/62 |
| 2009/0248937 | A1 | 10/2009 | Solomon et al. | |
| 2009/0276773 | A1 | 11/2009 | Brown et al. | |
| 2009/0313391 | A1 | 12/2009 | Watanabe | |
| 2010/0014526 | A1 | 1/2010 | Chavan et al. | |
| 2010/0082874 | A1 | 4/2010 | Baba et al. | |
| 2010/0095310 | A1 | 4/2010 | Oshins | |
| 2010/0180274 | A1 | 7/2010 | Cherian et al. | |

OTHER PUBLICATIONS

Performance Analysis of Dynamic Priority Shifting Philipp Reinecke, Katinka Wolter, and Johannes Zapotoczky Published: 2008.*
Converged Networking in the Data Center Peter P. Waskiewicz Jr. Published: Jul. 2009.*
A Scalable Architecture for Fair Leaky-Bucket Shaping Jennifer Rexford, Flavio Bonomi, Albert Greenberg, Albert Wong Published: 1997.*
Automated Ethernet Virtual Bridging Renato Recio and Omar Cardona Published: Sep. 2009.*

(Continued)

*Primary Examiner* — Emerson Puente
*Assistant Examiner* — Paul Mills
(74) *Attorney, Agent, or Firm* — Toler Law Group, P.C.

(57) ABSTRACT

A computer implemented method may include identifying allocations for each virtual function of a plurality of virtual functions that are provided via an input/output adapter. The computer implemented method may further include determining a range associated with each group of a plurality of groups based on the identified allocations. The computer implemented method may also include associating each virtual function with a group of the plurality of groups based on the range associated with the group. Where at least one group of the plurality of groups is empty, and where one or more groups of the plurality of groups has two or more virtual functions associated with the one or more groups, the computer implemented method may include distributing the two or more virtual functions to the at least one empty group. The computer implemented method may further include transferring the plurality of virtual functions from each group to a corresponding category at the input/output adapter.

18 Claims, 10 Drawing Sheets

(56) References Cited

OTHER PUBLICATIONS

A Strategy to Compute the InfiniBand Arbitration Tables F. J. Alfaro, Jose L. Sanchez, Jose Duato, Chita Das Published: 2002.*

QoS-Aware Service Composition in Dynamic Service Oriented Environments Nebil Ben Mabrouk, Sandrine Beauche, Elena Kuznetsova, Nikolaos Georgantas, and Valerie Issarny Published: 2009.*

* cited by examiner

MANAGING VIRTUAL FUNCTIONS OF AN INPUT/OUTPUT ADAPTER

I. FIELD OF THE DISCLOSURE

The present disclosure relates generally to managing virtual functions of an input/output (I/O) adapter.

II. BACKGROUND

In a virtualized computing system, an input/output (IO) adapter (e.g., a single hardware device) may appear as multiple virtual I/O adapters to multiple logical partitions. Each logical partition may execute an operating system and client applications that use one or more virtual functions of the virtual I/O adapters.

III. SUMMARY

In a particular embodiment, a computer-implemented method includes identifying allocations of a parameter that is associated with each virtual function of a plurality of virtual functions that are provided via an input/output adapter. The method includes determining a range associated with each group of a plurality of groups based on the identified allocations. The method also includes associating each virtual function with a group of the plurality of groups based on the range associated with the group. The method further includes if at least one group of the plurality of groups is empty and if one or more groups of the plurality of groups has two or more virtual functions associated with the one or more groups, distributing the two or more virtual functions to the at least one empty group. The method includes transferring the plurality of virtual functions from each group to a corresponding category at the input/output adapter.

In another particular embodiment, an apparatus includes a processor and a memory to store program code. The program code is executable by the processor to identify allocations of a parameter that is associated with each virtual function of a plurality of virtual functions that are provided via an input/output adapter. The program code is executable by the processor to determine a range associated with each group of a plurality of groups based on the identified allocations. The program code is further executable by the processor to associate each virtual function with a group of the plurality of groups based on the range associated with the group. The program code is executable by the processor to distribute the two or more virtual functions from the second group to the first group in response to determining that a first group of the plurality of groups is empty and that a second group of the plurality of groups has two or more virtual functions.

In another particular embodiment, a computer program product includes a non-transitory computer usable medium having computer usable program code embodied therewith. The computer usable program code is executable by a processor to identify allocations for each virtual function of a plurality of virtual functions that are provided via an input/output adapter. The computer usable program code is further executable by the processor to determine a range associated with each group of a plurality of groups based on the identified allocations. The computer usable program code is also executable by the processor to associate each virtual function with a group of the plurality of groups based on the range associated with the group. The computer usable program code is further executable by the processor to distribute the two or more virtual functions to the at least one empty group where at least one group of the plurality of groups is empty and where one or more groups of the plurality of groups has two or more virtual functions associated with the one or more groups. The computer usable program code is executable by the processor to transfer the plurality of virtual functions from each group to a corresponding category at the input/output adapter.

These and other advantages and features that characterize embodiments of the disclosure are set forth in the claims listed below. However, for a better understanding of the disclosure, and of the advantages and objectives attained through its use, reference should be made to the drawings and to the accompanying descriptive matter in which there are described exemplary embodiments of the disclosure.

IV. BRIEF DESCRIPTION OF THE DRAWINGS

V. DETAILED DESCRIPTION

Figure 1:
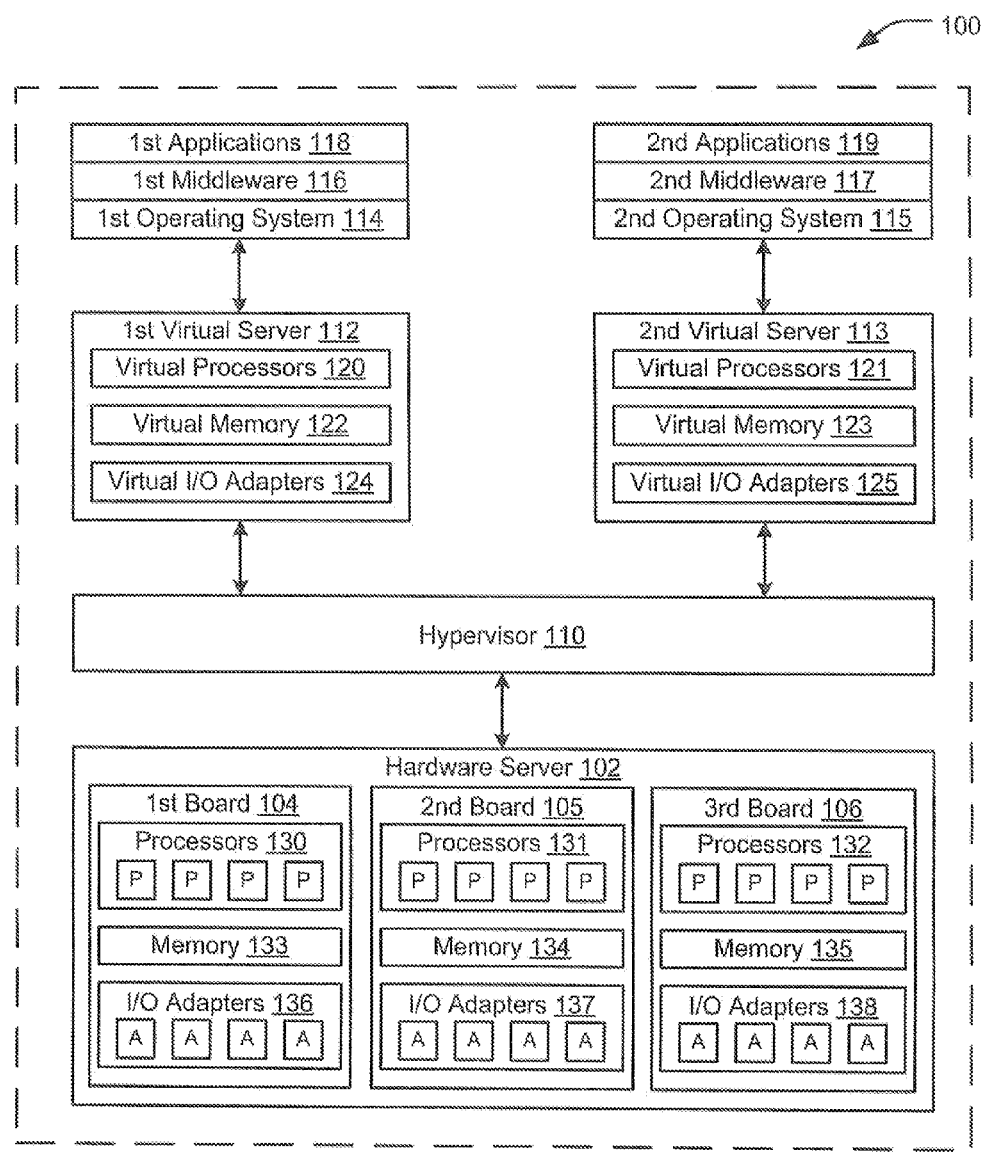
FIG. 1 is a block diagram of a first embodiment of a system to dynamically balance a parameter associated with one or more virtual functions.

In a virtualized system in which a hardware input/output (I/O) adapter provides virtual functions to client applications, different values may be assigned to a particular parameter associated with the virtual functions. For example, a percentage of bandwidth may be assigned to two or more virtual functions to enable different levels of quality of service (QoS). Low-level software (e.g., at a hypervisor level) may dynamically distribute and redistribute the virtual functions to enable the virtual functions to provide their assigned QoS levels.

To illustrate, a hardware I/O adapter may provide four categories of QoS (e.g., low, medium, high, and highest). An adjunct to the hypervisor may identify the QoS associated with each virtual function. The adjunct may allocate groups for use in distributing the virtual functions such that each group corresponds to one of the categories provided by the hardware I/O adapter. In this example, the adjunct may allocate four groups. The adjunct may identify an allocation associated with each virtual function. For example, the QoS allocation may be assigned as a percentage of available bandwidth.

Based on the allocations associated with the virtual functions, the adjunct may determine a range to associate with each of the groups. The adjunct may place each virtual function in a group based on the range associated with each group and the allocation associated with each virtual function. For example, a virtual function with a twelve percent of bandwidth allocation may be placed in a group with a range of ten percent to fifteen percent. The adjunct may determine a total QoS for each group by summing the QoS allocated to each virtual function placed in each group.

The adjunct may distribute the virtual functions in response to determining that at least one group is empty and that at least one of the groups has two or more virtual functions. For example, the adjunct may select the group with a maximum number of virtual functions and transfer one or more of the functions in that group to one of the empty groups. Where two or more groups have the maximum number of virtual functions, the adjunct may select the group with the lowest total QoS or the group with the lowest QoS range. The adjunct may iteratively repeat this process to distribute the virtual functions until each group has at least one virtual function. The process of grouping and distributing the virtual functions may be performed where a virtual function is added, where a virtual function is removed, where the allocation assigned to one or more virtual functions has been modified, or any combination thereof.

After the virtual functions have been distributed, the adjunct may dynamically (e.g., substantially in real-time) transfer the virtual functions from each group to the corresponding category at the hardware I/O adapter. The hardware I/O adapter may execute the virtual functions based on the category into which each virtual function is placed to enable the bandwidth allocations to provide appropriate levels of QoS. The virtual functions in a particular category may equally share (e.g., equally timeshare) the bandwidth associated with the particular category. The adjunct may group and distribute virtual functions based on different parameters, such as the bandwidth allocation (e.g., QoS) of each virtual function, a number of queues assigned to each virtual function, a number of interrupts assigned to each virtual function, another parameter associated with each virtual function, or any combination thereof.

Referring to FIG. 1, a block diagram of a first embodiment of a system to dynamically balance a parameter associated with one or more virtual functions is depicted and generally designated 100. The system 100 may include a hardware server 102 that is managed by a hypervisor 110. The hardware server 102 may include hardware resources, such as a first board 104, a second board 105, and a third board 106. While three boards are illustrated in FIG. 1, the number of boards may be increased or decreased based on processing requirements. The boards 104-106 may include processors 130-132, memory 133-135, and input/output (I/O) adapters 136-138. Each of the boards 104-106 may include additional hardware resources (not shown), such as specialized processors (e.g., digital signal processors, graphics processors, etc.), disk drivers, other types of hardware, or any combination thereof. The processors 130-132, the memory 133-135, and the I/O adapters 136-138 of the hardware server 102 may be managed by hypervisor 110. Each processor of the processors 130-132 may be a simultaneous multithreading (SMT)-capable processor that is capable of concurrently executing multiple different threads.

The hypervisor 110 may create and manage logical partitions (LPARs), such as virtual servers 112, 113. A logical partition may be a subset of the resources of the hardware server 102 that is virtualized as a separate virtual server. Each of the virtual servers 112, 113 may have its own set of virtual resources, similar to a physical server. For example, the first virtual server 112 may include virtual processors 120, virtual memory 122, and virtual I/O adapters 124. Virtual server 113 may include virtual processors 121, virtual memory 123, and virtual I/O adapters 125. The hypervisor 110 may map the virtual servers 112, 113 to the hardware of the hardware server 102. For example, the virtual processors 120, 121 may be mapped to the processors 130-132, the virtual memory 122-123 may be mapped to memory 133-135, and the virtual I/O adapters 124-125 may be mapped to the I/O adapters 136-138. The hypervisor 110 may manage the selection of portions of the hardware server 102 and their temporary assignment to portions of the virtual servers 112, 113.

In the system 100, a particular I/O adapter of the I/O adapters 136-138 may be virtually divided to enable the particular I/O adapter to be used by more than one virtual server. Each of the I/O adapters 136-138 may provide virtual functions that may be used by one or more of the applications 117-119, the middleware 116, 117, and the operating systems 114, 115. A parameter associated with the virtual functions (not shown), such as a quality of service (QoS), may be dynamically balanced by an adjunct (not shown) of the hypervisor 110. For example, a physical function adjunct may categorize and distribute/redistribute virtual functions to enable applications to specify a QoS for one or more virtual functions. The physical function adjunct may group and distribute/redistribute virtual functions based on additional parameters associated with the virtual functions, such as a number of queues distributed to each virtual function, a number of interrupts assigned to each virtual function, another parameter associated with the virtual functions, or any combination thereof. After distributing the virtual functions among groups, the physical function adjunct may transfer the virtual functions from the groups to corresponding categories at one the I/O adapters 136-138.

Figure 2:
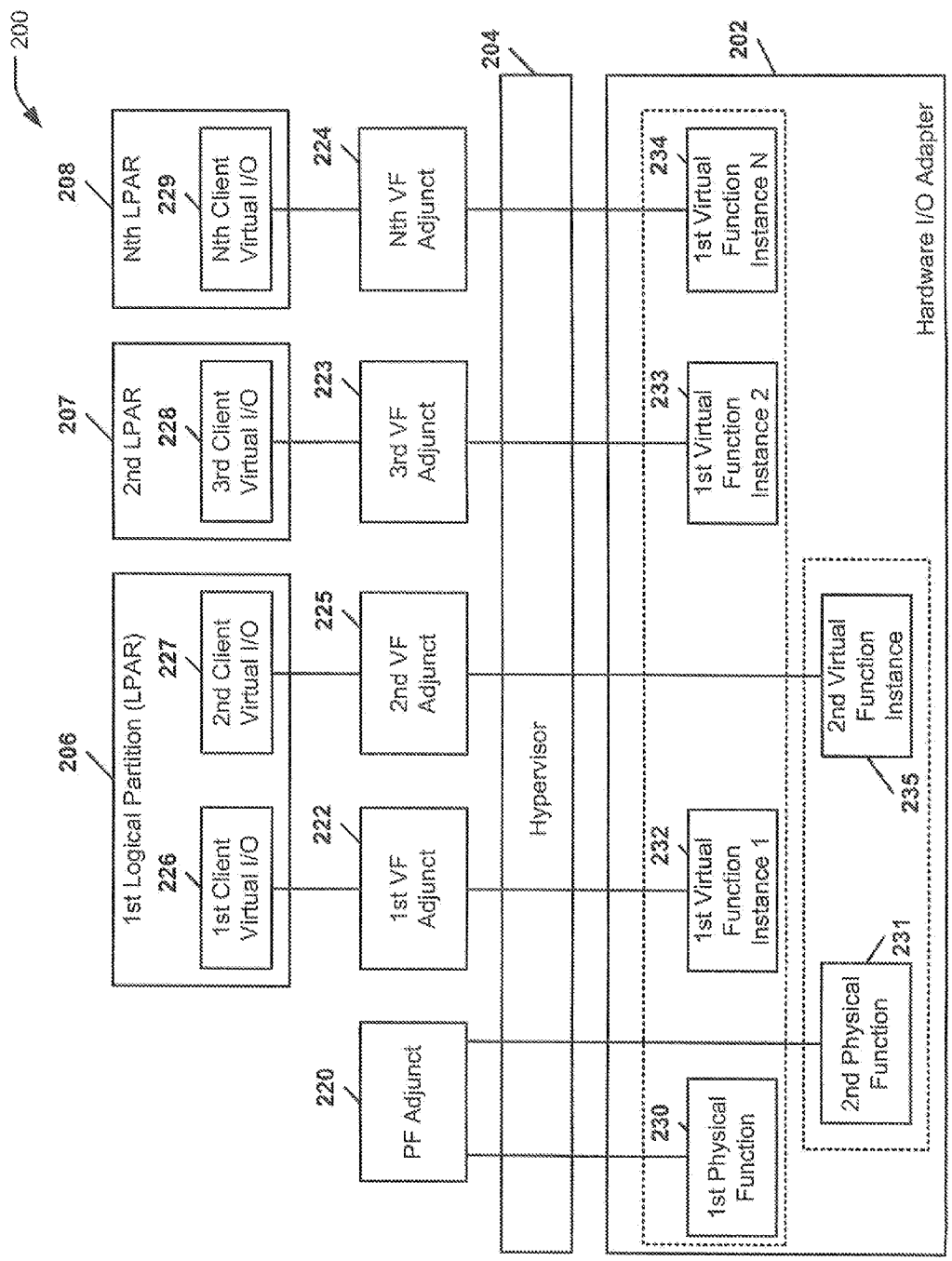
FIG. 2 is a block diagram of a second embodiment of a system to dynamically balance a parameter associated with one or more virtual functions.

Referring to FIG. 2, a block diagram of a second embodiment of a system to dynamically balance a parameter associated with one or more virtual functions is depicted and generally designated 200. In the system 200, a hypervisor 204 may enable multiple logical partitions to access virtual functions provided by hardware that includes a hardware I/O adapter 202. For example, the hypervisor 204 may enable a first logical partition 206, a second logical partition 207, and an Nth logical partition 208, to access virtual functions 232-235 that are provided by the hardware I/O adapter 202. To illustrate, the hypervisor 204 may use a first physical function 230 of the hardware I/O adapter 202 to provide a first instance of a first virtual function 232, a second instance of a first virtual function 233, and an Nth instance of a first virtual function 234 to the logical partitions 206-208. The hypervisor 204 may use a second physical function 231 of the hardware I/O adapter 202 to provide a second virtual function 235 to the logical partitions 206-208.

The physical functions 230, 231 may include peripheral component interconnect (PCI) functions that support single root I/O virtualization capabilities (SR-IOV). Each of the virtual functions 232-235 may be associated with one of the physical functions 230, 231 and may share one or more physical resources of the hardware I/O adapter 202.

Software module adjuncts, such as a physical function (PF) adjunct 220 and virtual function (VF) adjuncts 222-225, may assist the hypervisor in managing the physical functions 230, 231 and the virtual functions 232-235. For example, a user may specify a particular configuration and the PF adjunct 220 may configure the physical functions 230, 231 to host the virtual functions 232-235 based on the user specified configuration. The VF adjuncts 222-225 may function as virtual device drivers. For example, as a device driver for a physical device may enable a client application to access the functions of the device, each of the VF adjuncts 222-225 may enable a client application to access the virtual functions 232-235. In the system 200, the VF adjuncts 222, 224, and 225 may enable access to the first virtual function instances 232, 234, and 235, and the second VF adjunct 225 may enable access to the second virtual function 235.

In operation, the PF adjunct 220 may enable the first physical function 230 to host the first virtual function instances 232-234. The PF adjunct 220 may enable the second physical function 231 to host the second virtual function 235. The virtual functions 232-235 may be enabled based on a user provided configuration. Each of the logical partitions 206-208 may execute an operating system (not shown) and client applications (not shown). The client applications that execute at the logical partitions 206-208 may perform virtual input/output operations. For example, a first client application executing at the first logical partition 206 may include first client virtual I/O 226, and a second client application executing at the first logical partition 206 may include a second client virtual I/O 227. The first client virtual I/O 226 may access the first instance of the first virtual function 232 via the first VF adjunct 222. The second client virtual I/O 227 may access the second virtual function 235 via the second VF adjunct 225. A third client virtual I/O 228 executing at the second logical partition 207 may access the second instance of the first virtual function 233 via the third VF adjunct 223. An Nth client virtual I/O 229 executing at the Nth logical partition 208 may access the Nth instance of the first virtual function 233 via the Nth VF adjunct 223.

In the system 200, the PF adjunct 220 may group and distribute the virtual functions 232-235 to enable client applications executing at the logical partitions 206-208 to specify a parameter associated with each of the virtual functions 232-235. For example, each of the virtual functions 232-235 may be assigned a percentage of bandwidth to enable the virtual functions 232-235 to each provide a particular quality of service (QoS) level.

Figure 3:
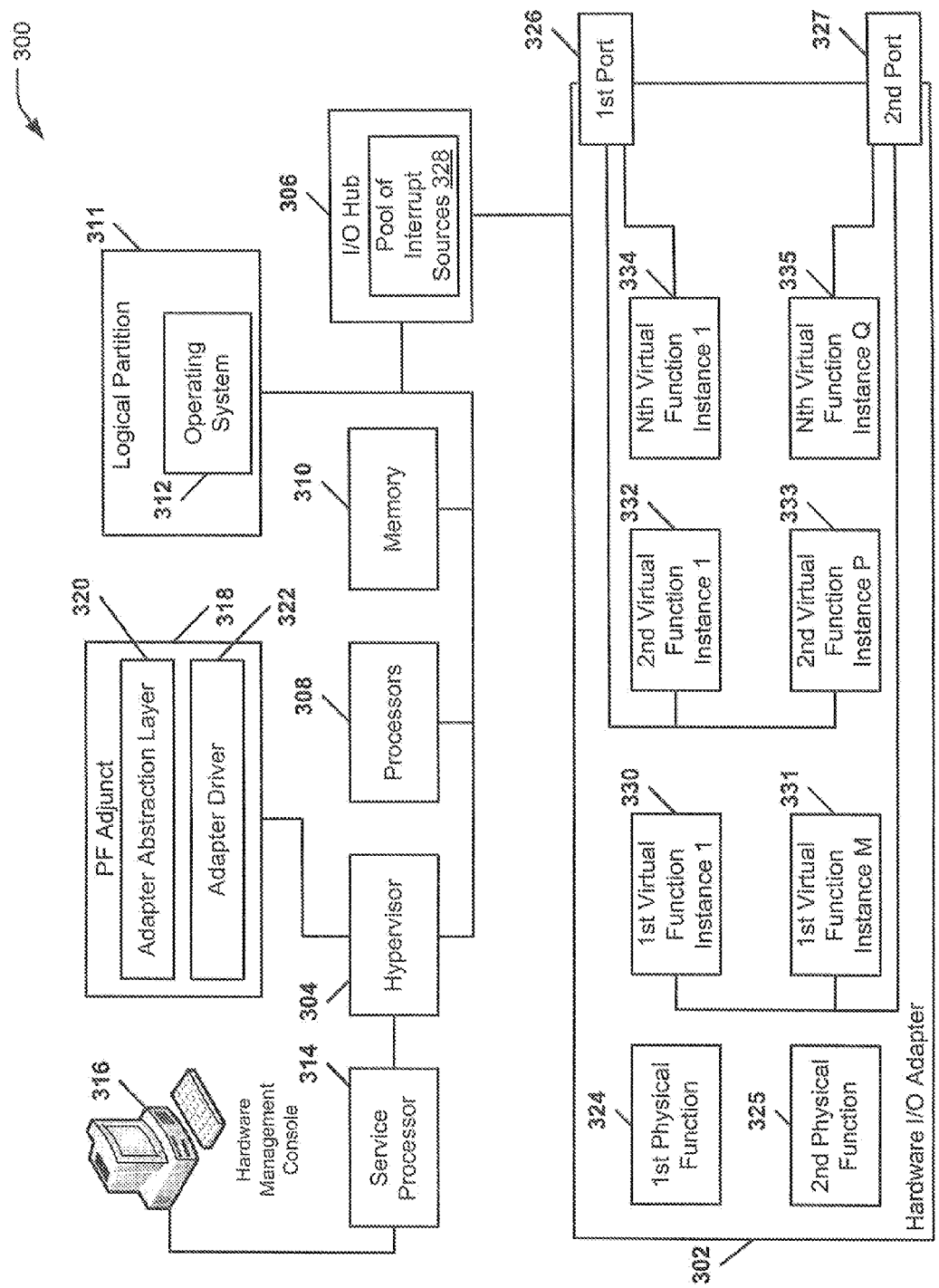
FIG. 3 is a block diagram of a third embodiment of a system to dynamically balance a parameter associated with one or more virtual functions.

Referring to FIG. 3, a block diagram of a third embodiment of a system to dynamically balance a parameter associated with one or more virtual functions is depicted and generally designated 300. In the system 300, a hypervisor 304 may be coupled to hardware devices, such as a hardware I/O adapter 302, an I/O hub 306, processors 308, and memory 310. The hypervisor 304 may be coupled to a logical partition 311 that executes an operating system 312. The hypervisor 304 may enable the logical partition 311 to access virtual functions associated with the hardware I/O adapter 302. A physical function (PF) adjunct 318 may be coupled to the hypervisor 304 to manage the physical functions of the hardware I/O adapter 302. A hardware management console 316 may be coupled to the hypervisor 304 via a service processor 314.

The service processor 314 may be a micro-controller that is embedded in a hardware server (e.g., the hardware server 102 of FIG. 1) to enable remote monitoring and management of the hardware server via the hardware management console 316. For example, the hardware management console 316 may be used by a system administrator to specify a configuration of hardware devices, such as specifying virtual functions of the hardware I/O adapter 302. The PF adjunct 318 may configure virtual functions of the hardware I/O adapter 302 based on configuration information provided by a system administrator via the hardware management console 316.

The hypervisor 304 enable hardware devices, such as the hardware I/O adapter 302, to be logically divided into virtual resources and accessed by one or more logical partitions (e.g., the N logical partitions 206-208 of FIG. 2). The I/O hub 306 may include a pool of interrupt sources 328. The hypervisor 304 may associate at least one interrupt source from the pool of interrupt sources 328 with each virtual function of the hardware I/O adapter 302. The I/O hub 306 may be used to connect to and control I/O devices, such as the hardware I/O adapter 302.

The processors 308 may include one more processors, such as central processing units (CPUs), digital signal processors (DSPs), other types of processors, or any combination thereof. One or more of the processors 308 may be configured in a symmetric multiprocessor (SMP) configuration.

The memory 310 may include various types of memory storage devices, such as random access memory (RAM) and disk storage devices. The memory 310 may be used to store and retrieve various types of data. For example, the memory 310 may be used to store and to retrieve operational instructions that are executable by one or more of the processors 308.

The operating system 312 may execute within the logical partition 311. The virtual I/O of client applications (e.g., the client virtual I/Os 226-229 of FIG. 2) that execute using the operating system 312 may access virtual functions of the hardware I/O adapter 302. The hypervisor 304 may use the UI hub 306 to connect to control I/O devices, such as the hardware I/O adapter 302.

The PF adjunct 318 may include an adapter abstraction layer 320 and an adapter driver 322. The adapter abstraction layer 320 may include a generic abstraction to enable configuration of physical functions and virtual functions of the hardware I/O adapter 302. The adapter driver 322 may be specific to each particular model of hardware adapter. The adapter driver 322 may be provided by a manufacturer of the hardware I/O adapter 302.

The hardware I/O adapter 302 may include physical functions and ports, such as a first physical function 324, a second physical function 325, a first port 326, and a second port 327. The PF adjunct 318 may configure virtual functions based on the physical functions 324, 325 and may associate the virtual functions with one or more of the ports 326, 327 of the hardware I/O adapter 302. For example, the PF adjunct 318 may configure the first physical function 324 to host multiple instances of a first virtual function, such as the first instance of the first virtual function 330 and the Mth instance of the first virtual function 331, where M>1. The instances of the first virtual function 330, 331 may be associated with the second port 327.

The PF adjunct 318 may configure the second physical function 325 to host multiple instances of a second virtual function, such as the first instance of the second virtual function 332 and the Pth instance of the second virtual function 333, where P>1. The instances of the second virtual function 332, 333 may be associated with the first port 326. The PF adjunct 318 may configure multiple instances of an Nth virtual function, such as the first instance of the Nth virtual function 334 and the Qth instance of the Nth virtual function 335, where N>2 and Q>1. The instances of the Nth virtual function 334, 335 may be associated with the second port 327. The instances of the Nth virtual function 334, 335 may be hosted by a physical function, such as one of the first physical function 324, the second physical function 325, and another physical function (not shown).

The PF adjunct 318 may group and distribute the virtual functions 330-335 that are associated with the physical functions 324, 325 of the hardware I/O adapter 302 to enable client applications to specify a parameter associated with each of the virtual functions 330-335. For example, each of the virtual functions 330-335 may be assigned a percentage of bandwidth to enable the virtual functions 330-335 to each provide a particular quality of service (QoS) level. The adapter abstraction layer 320, the adapter driver 322, or a combination of both may group and distribute the virtual functions 330-335.

Figure 4:
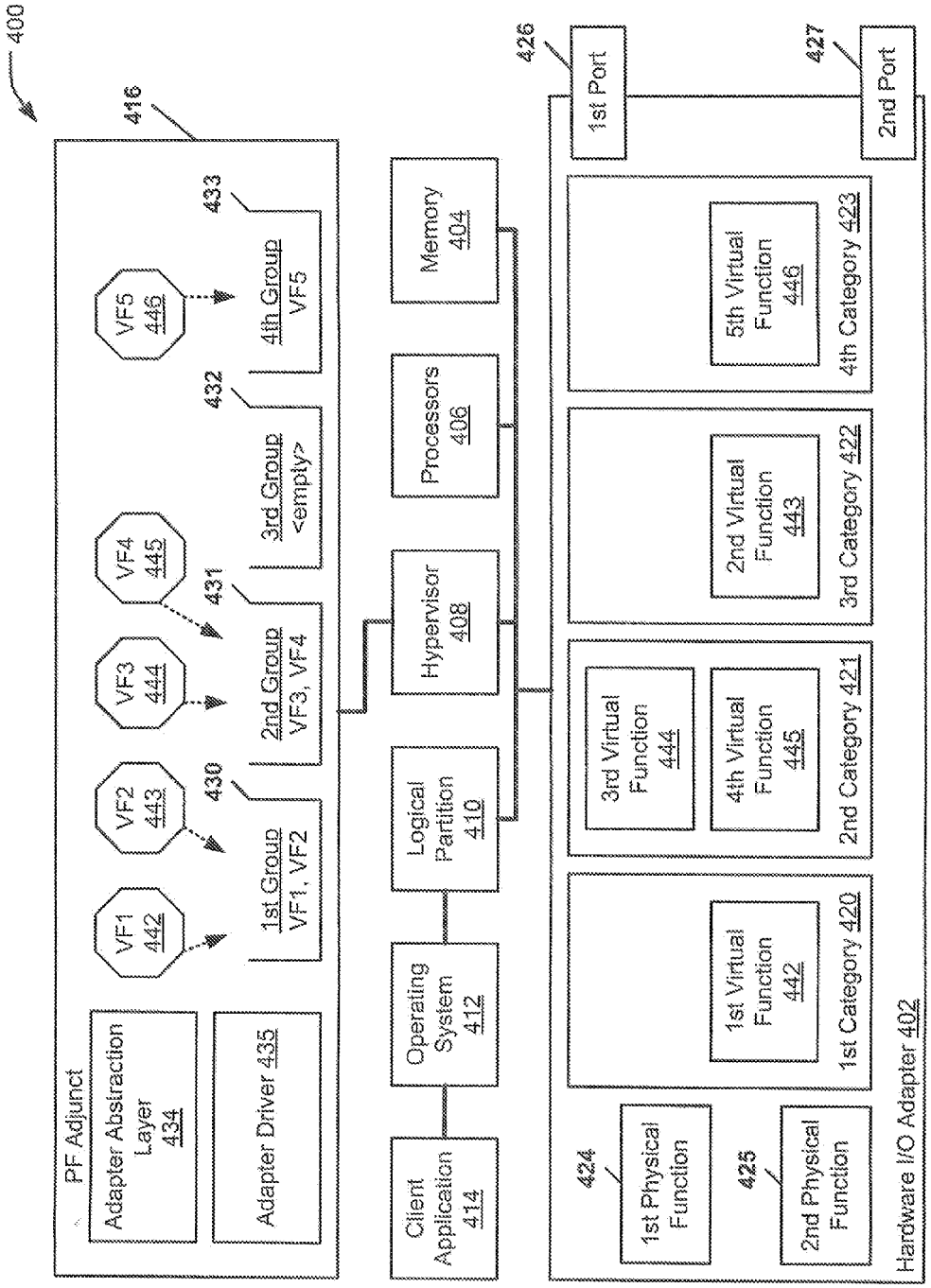
FIG. 4 is a block diagram of a fourth embodiment of a system to dynamically balance a parameter associated with one or more virtual functions.

Referring to FIG. 4, a block diagram of a fourth embodiment of a system to dynamically balance a parameter associated with one or more virtual functions is depicted and generally designated 400. The system 400 includes hardware resources, such as a hardware input/output (I/O) adapter 402, a memory 404, and processors, which are coupled to and managed by a hypervisor 408. The hypervisor 408 may provide logical partitions, such as a logical partition 410, with access to virtualized resources that are hosted by the hardware resources (e.g., the hardware I/O adapter 402). An operating system 412 and one or more client applications, such as a client application 414, may be associated with the logical partition 410.

The hardware I/O adapter 402 may include two or more categories, such as a first category 420, a second category 421, a third category 422, and a fourth category 423. For example, the categories 420-423 may be I/O traffic categories that are associated with incoming/outgoing data traffic. To illustrate, the first category may be provided for low priority traffic (e.g., non-critical messaging), and the second category 421 may be provided for medium priority traffic (e.g., electronic mail). The third category 422 may be provided for high priority traffic (e.g., streaming audio and/or video), and the fourth category 423 may be provided for a highest priority traffic (e.g., voice over internet protocol). The hardware I/O adapter 402 may include multiple physical functions, such as a first physical function 424 and a second physical function 425, as well as multiple ports, such as a first port 426 and a second port 427. Virtual functions 442-446 may be hosted by the physical functions 424, 425 and may access one or more of the ports 426, 427.

The PF adjunct 416 may be an adjunct to the hypervisor 408 that manages the physical functions 424, 425 and the mapping of the virtual functions 442-446 to the physical functions 424, 425. The PF adjunct 416 may include an adapter abstraction layer 434 and an adapter driver 435. The adapter driver 435 may be specific to a particular model or type of the hardware I/O adapter 402. The adapter driver 435 may enable various features that are specific to the hardware I/O adapter 402. The adapter driver 435 may be provided by a manufacturer of the hardware I/O adapter. The adapter abstraction layer 434 may provide an abstraction of the various functions of the hardware adapter 402 to enable a client application to use the virtual functions 442-446 without having to send adapter-specific commands. For example, the adapter abstraction layer 434 may enable a client application to use generic commands (e.g., "allocate three Ethernet virtual functions") to use the virtual functions 442-446.

In operation, the PF adjunct 416 may receive a request to enable the virtual functions 442-446 via the hardware I/O adapter 402. The PF adjunct 416 may identify an allocation (not shown) that is assigned to each of the virtual functions 442-446. The PF adjunct may allocate groups 430-433 for grouping and distributing the virtual functions 442-446 prior to transferring them to the categories 420-423 of the hardware I/O adapter 402. The PF adjunct 416 may allocate groups that correspond to the categories 420-423. For example, the first group 430 may correspond to the first category 420, and the second group 431 may correspond to the second category 421. The third group 432 may correspond to the third category 422, and the fourth group 433 may correspond to the fourth category 423.

The PF adjunct 416 (e.g., the adapter abstraction layer 434, the adapter driver 435, or a combination of both) may determine and assign ranges for the groups 430-433 based on the allocations assigned to the virtual functions 442-446. The PF adjunct 416 may place each of the virtual functions 442-446 in one of the groups 430-433 based on the allocation assigned to that virtual function and based on the range assigned to each of the groups 430-433. For example, any virtual function that is assigned a bandwidth allocation between one percent and ten percent (e.g., seven percent) may be assigned to a group that has a range of one percent to ten percent. This is described in more detail in FIG. 8 and FIG. 9.

Where at least one of the groups 430-433 is empty and at least one of the groups 430-433 has two or more virtual functions, the PF adjunct 416 may distribute one or more of the virtual functions 442 to an empty group of the groups 430-433. For example, in FIG. 4, the virtual functions 442, 443 may be placed in the first group 430, and the virtual functions 444, 445 may be placed in the second group 431. The fifth virtual function 446 may be placed in the fourth group 433, leaving the third group 432 empty. In this example, the first and second groups 430, 431 each have two virtual functions. The PF adjunct 416 may distribute at least one of the virtual functions 442-445 from the first and second groups 430, 431 to the third group 432.

The PF adjunct may select one of the groups 430-433 and distribute one or more of the virtual functions in the selected group. The group may be selected based on a number of virtual functions in the group, the range assigned to the group, a total QoS associated with the group, another factor associated with the virtual functions, or any combination thereof. For example, the PF adjunct 416 may select a group from the groups 430-433 that has a highest number of virtual functions placed in that group. If two or more groups have the highest number of virtual functions, the PF adjunct 416 may select the group with the lowest range. The PF adjunct 416 may iteratively distribute the virtual functions 442-446 until all of the groups 430-433 have at least one virtual function, e.g., none of the groups 430-433 are empty. In the system 400, the PF adjunct 416 may distribute the second virtual function 443 from the first group 430 to the third group 432.

Where none of the groups 430-433 are empty, the PF adjunct 416 may transfer the virtual functions in each of the groups 430-433 to the corresponding categories 420-423 at the I/O adapter. The first virtual function 442 may be transferred from the first group 430 to the first category 420, and the virtual functions 444-445 may be transferred from the second group 431 to the second category 421. The fifth virtual function 446 may be transferred from the fourth group 433 to the fourth category 423, and the third virtual function 44, after distribution from the first group 430 to the third group 432, may be transferred to the third category 422.

The PF adjunct 416 may thus group and distribute the virtual functions 442-446 among the groups 430-433 to enable client applications to assign bandwidth allocations to each of the virtual functions 442-446. The PF adjunct 416 may transfer the distributed virtual functions 442-446 from the groups 430-433 to the corresponding categories 420-423 at the hardware I/O adapter 402. At the I/O adapter 402, the virtual functions in each of the categories 420-423 may equally timeshare the bandwidth of that category. For example, the virtual functions 444-445 may equally timeshare the bandwidth associated with the second category 421.

Figure 5:
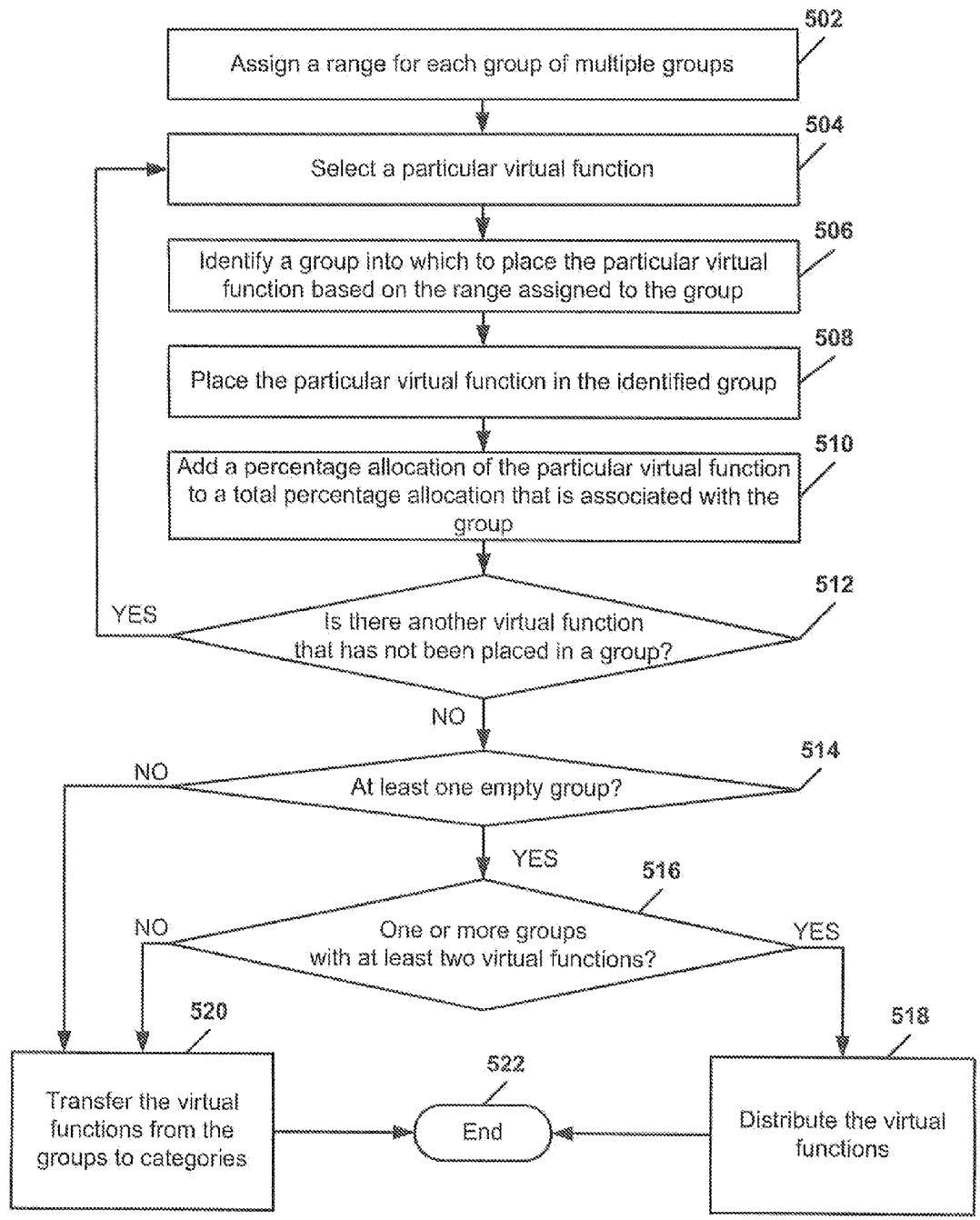
FIG. 5 is a flow diagram of a first method to dynamically balance a parameter associated with one or more virtual functions.

Referring to FIG. 5, a flow diagram of a first method to dynamically balance a parameter associated with one or more virtual functions is depicted. The method may be performed by a physical function (PF) adjunct, such as the PF adjunct 220 of FIG. 2, the PF adjunct 318 of FIG. 3, and the PF adjunct 416 of FIG. 4. The method may begin where a range is assigned to each group of multiple groups. The range may be determined using a particular set of calculations. The set of calculations may be modified to achieve different distributions. For example, one set of calculations to determine a range may be as follows:

Range of each group=(MaxVF−MinVF+1)/(Number of groups), where MaxVF is a highest allocation assigned to a virtual function and MinVF is a lowest allocation assigned to a virtual function.

To illustrate, in FIG. 4 (see also FIG. 8 and FIG. 9), the virtual functions 442 and 443 may be allocated five percent of bandwidth; the virtual functions 444-445 may be each allocated ten percent of the bandwidth, and the fifth virtual function 446 may be allocated twenty percent of the bandwidth. In this example, the highest allocation is twenty percent; the lowest allocation is five percent, and there are four groups. Thus, the range of each group=(20−5+1)/4=4. A PF adjunct may assign a range of one percent to five percent to the first group. A range of six percent to ten percent may be assigned to the second group, and a range of eleven percent to fifteen percent may be assigned to the third group. A range of sixteen percent to twenty percent may be assigned to the fourth group.

Moving to 504, a particular virtual function is selected. Advancing to 506, a group in which to place the particular virtual function may be identified based on the range assigned to the group. Proceeding to 508, the particular virtual function may be placed in the identified group. For example, the virtual functions 442-443 that are assigned five percent may be placed in the first group 430 based on the range of one percent to five percent of the first group 430. The virtual functions 444-445 that are assigned ten percent may be placed in the second group 431 based on the range of six percent to ten percent of the second group 431. The virtual function 446 that is assigned twenty percent may be placed in the fourth group 433 based on the range of sixteen percent to twenty percent of the fourth group 433.

Moving to 510, a percentage allocation of the particular virtual function may be added to a total percentage allocation that is associated with the group. For example, the total allocation of the first group 430 of FIG. 4 may be ten percent (e.g., the five percent of the first virtual function 442 plus the five percent of the second virtual function 443). The total allocation of the second group 431 may be twenty percent (e.g., the ten percent of the third virtual function 444 plus the ten percent of the fourth virtual function 445). The total allocation of the fourth group 433 may be twenty percent (e.g., the twenty percent of the fifth virtual function 446).

Advancing to 512, a determination may be made as to whether there is another virtual function that has not been placed in a group. Where each of the virtual functions has not been placed in a group, the method may repeat by selecting another particular virtual function at 504. Where each of the virtual functions has alternatively been placed in a group, a determination may be made as to whether there is at least one empty group at 514. Where there are no empty groups, the virtual functions may be transferred from the groups to categories at an I/O adapter at 520, and the method may end at 522.

Where at least one of the groups is empty, a determination may be made as to whether at least two virtual functions have been placed in one or more of the groups at 516. Where at least two virtual functions have been placed in one or more of the groups, the virtual functions may be distributed among the groups (e.g., see FIG. 6) at 518, and the method may end at 522.

Thus, a PF adjunct may group and iteratively distribute virtual functions prior to transferring them to categories at an I/O adapter. The PF adjunct may group and iteratively distribute virtual functions based on different parameters associated with the virtual functions. Such parameters may include a bandwidth allocation assigned to each virtual function, a number of queues assigned to each virtual function, a number of interrupts assigned to each virtual function, another parameter associated with each virtual function, or any combination thereof.

Figure 6:
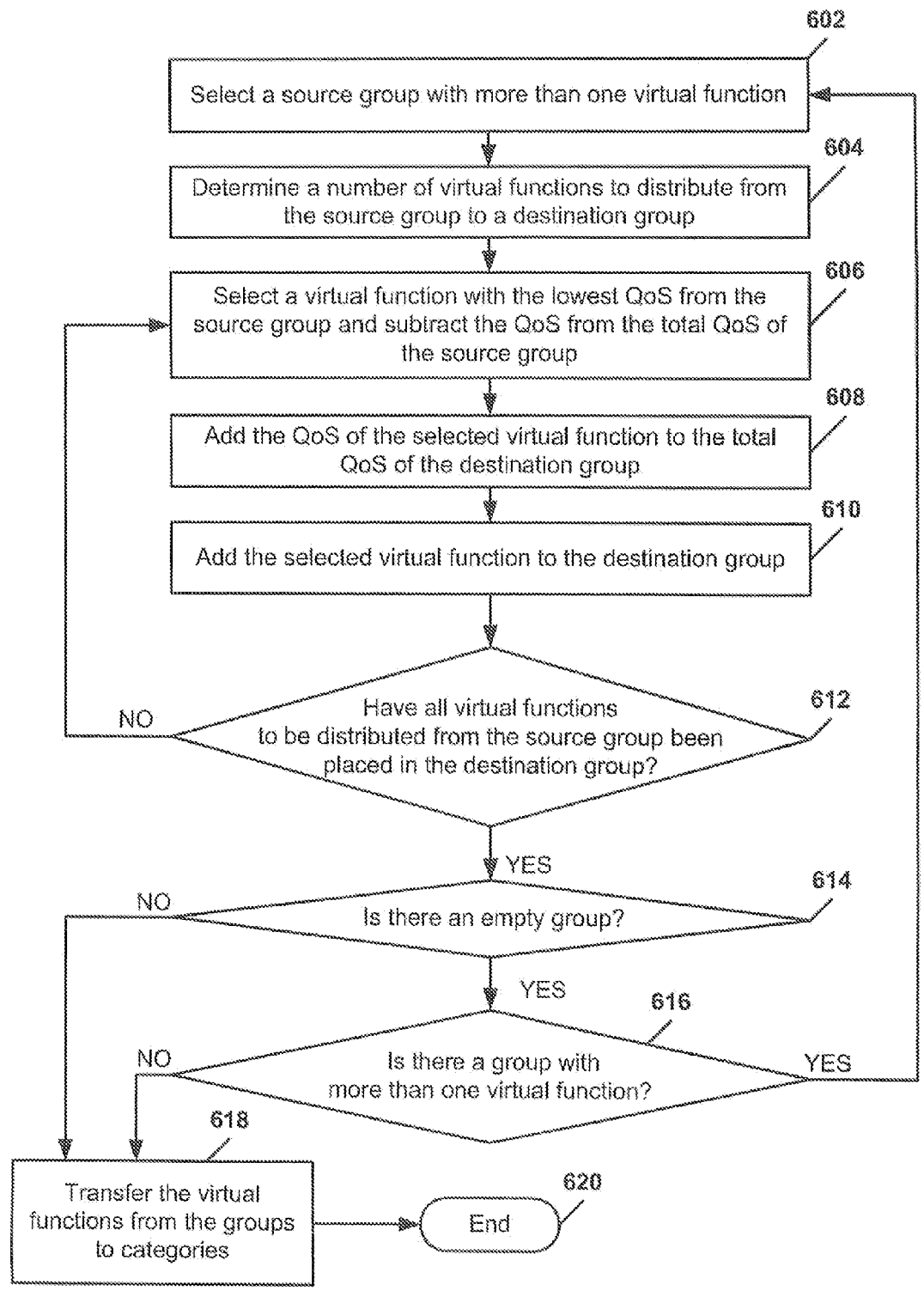
FIG. 6 is a flow diagram of a second method to dynamically balance a parameter associated with one or more virtual functions.

Referring to FIG. 6, a flow diagram of a second method to dynamically balance a parameter associated with one or more virtual functions is depicted. The method may be performed by a physical function (PF) adjunct, such as the PF adjunct 220 of FIG. 2, the PF adjunct 318 of FIG. 3, and the PF adjunct 416 of FIG. 4. The method of FIG. 6 may be used by a PF adjunct to distribute virtual functions after they have been grouped. For illustration purposes, the examples used in FIG. 6 are associated with quality of service (QoS) parameters. However, the method described in FIG. 6 may be used for other parameters associated virtual functions, such as a number of queues assigned to each virtual function and a number of interrupts assigned to each virtual function.

The method may begin when a source group with more than one virtual function is selected. For example, one of the first group 430 and the second group 431 of FIG. 4 may be selected because the groups 430, 431 each have two virtual functions. The source group may be selected based on a number of virtual functions that have been placed in the group. For example, the source group may be a particular group among the groups 430-433 that has the highest number of virtual functions. Where two or more groups have the highest number of virtual functions, the source group may be selected based on a range assigned to the group. For example, in FIG. 4 (see also FIG. 8 and FIG. 9), the first group 430 has virtual functions 442, 443 and the second group 431 has two virtual functions 444, 445, e.g., each of the groups 430, 431 have two virtual functions. The first group 430 may be selected as the source group because the range (e.g., one percent to five percent) assigned to the first group 430 is less than the range (e.g., six percent to ten percent) assigned to the second group 431. The first group 430 may be selected as the source group because the total allocation (e.g., ten percent) calculated for the first group 430 is less than the total allocation (e.g., twenty percent) assigned to the second group 431.

Advancing to 604, a number of virtual functions to transfer (e.g., distribute) from the source group to a destination group may be determined. For example, the total number of virtual functions in the source group may be divided by two to determine the number of virtual functions to transfer from the source group to the destination group. The result of the division may be rounded down (e.g., 1.5 may be rounded down to 1) or rounded up (e.g., 1.5 may be rounded up to 2) to determine the number of virtual functions to transfer from the source group. In FIG. 4, one virtual function may be moved because the first group 430 has virtual functions 442-443 (e.g., two divided by two is one).

Advancing to 606, a virtual function with the lowest QoS may be selected from the source group, and the QoS of the virtual function may be subtracted from the total QoS of the source group. For example, the virtual function of FIG. 4 with the lowest assigned QoS percentage may be selected from the source group. Proceeding to 608, the QoS of the selected virtual function may be added to the total QoS of the destination group. Continuing to 610, the selected virtual function may be added to the destination group. For example, in FIG. 4, the second virtual function 443 may be selected from the source group 430 and may be transferred to the third group 432. The QoS of the second virtual function 443 may be subtracted from the total QoS associated with the source group 430 (e.g., subtract five percent from ten percent). The QoS of the second virtual function 443 may be added to the total QoS associated with the destination group 432 (e.g., add five percent to zero percent).

Moving to 612, a determination may be made as to whether all the virtual functions that are to be transferred from the source group have been transferred to the destination group. Where all the virtual functions that are to be transferred from the source group have not been transferred to the destination group, the method may repeat by proceeding to 606, where another virtual function with the lowest QoS may be selected from the source group. Where all the virtual functions that are to be transferred from the source group have been transferred to the destination group, a determination may be made as to whether there is at least one empty group at 614. Where there are no empty groups, the virtual functions may be transferred at 618 from the groups to categories at an I/O adapter, and the method may end at 620.

Where at least one of the groups is empty, a determination may be made as to whether a group has more than one virtual function at 616. Where a group has more than one virtual function, the method may proceed to 602 where another source group may be selected. Where a group does not have more than one virtual function, the method may end at 620.

Thus, virtual functions may be distributed from a source group to a destination group. The total allocation of a particular parameter (e.g., QoS) associated with the source group and with the destination group may be modified. For example, the QoS of each of the virtual functions that is transferred may be subtracted from the total QoS of the source group and added to the total QoS of the destination group. The virtual functions may be iteratively distributed among the groups until each group has at least one virtual function.

Figure 7:
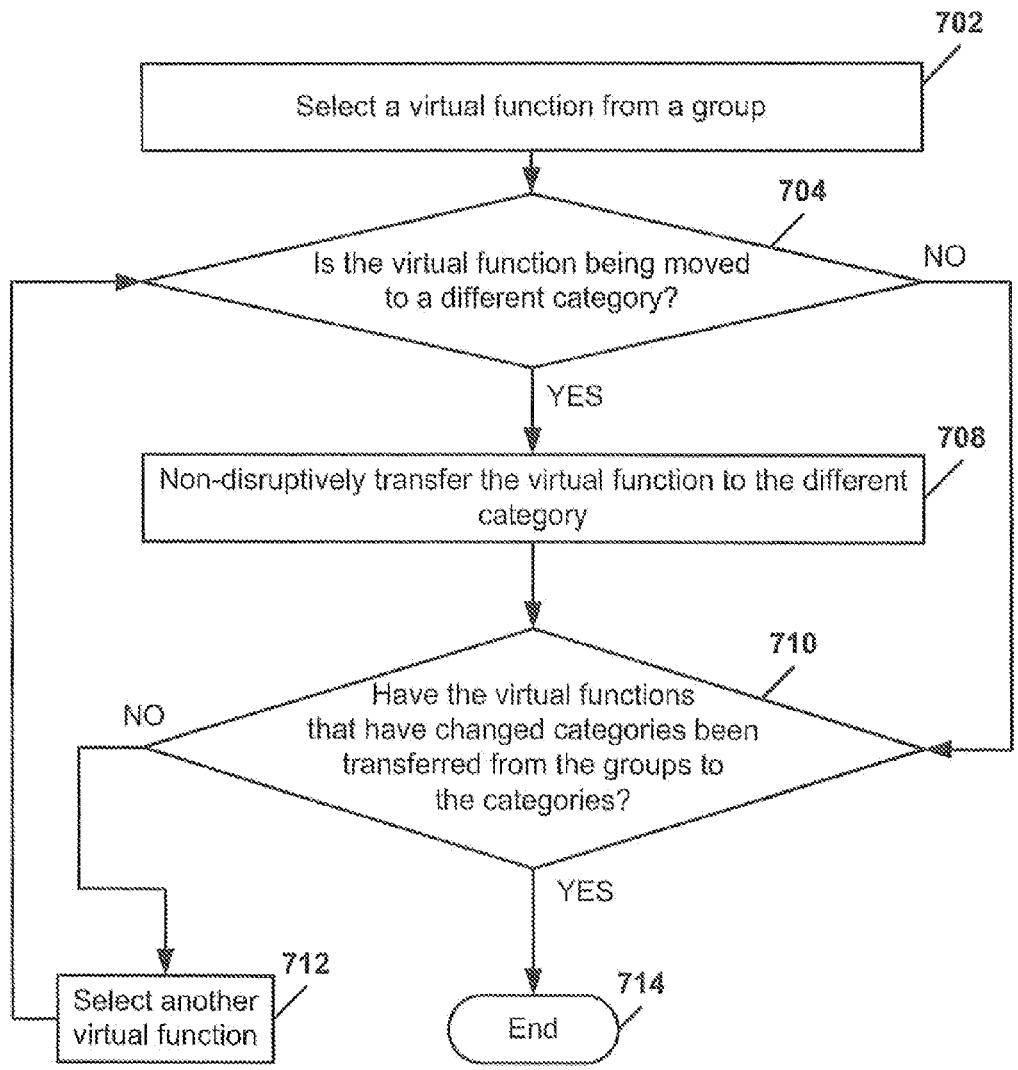
FIG. 7 is a flow diagram of a third method to dynamically balance a parameter associated with one or more virtual functions.

Referring to FIG. 7, a flow diagram of a third method to dynamically balance a parameter associated with one or more virtual functions is depicted. The method may be performed by a physical function (PF) adjunct, such as the PF adjunct 220 of FIG. 2, the PF adjunct 318 of FIG. 3, and the PF adjunct 416 of FIG. 4. For example, the method of FIG. 7 may be used where a physical function (PF) adjunct transfers virtual functions from groups to categories at a hardware I/O adapter.

The method may begin when a virtual function is selected from a group, at 702. Moving to 704, a determination may be made as to whether the virtual function is being moved to a different category. If a determination is made at 704 that the virtual function is being moved to a different category, the virtual function may be non-disruptively transferred from the group to the category, at 708, and the method proceeds to 710. When transferring virtual functions from groups to categories, those virtual functions that have been assigned to a different category may be non-disruptively transferred. In contrast, a virtual function that remains in the same category may not be transferred. For example, after a determination is made that a virtual function has been assigned a different category, the virtual function may be non-disruptively transferred from a particular group to the corresponding category at a hardware I/O adapter. To non-disruptively transfer the virtual function, the quality of service (or another parameter) allocation for a virtual function may be subtracted from the total allocation associated with the original category of the virtual function. The quality of service allocation for the virtual function may be added to the total allocation associated with the new category to which the virtual function is being transferred. The virtual function may then be transferred to the new category. In this way, virtual functions may be non-disruptively redistributed among categories while other virtual functions are running. Thus, when the virtual functions are redistributed, both the virtual functions that are executing and the virtual functions that are being redistributed are not disrupted.

To illustrate, the PF adjunct 416 of FIG. 4 may determine that the first virtual function 442 was originally in the first category 420. After distributing the virtual functions 442-446 among the groups 430-433, the first virtual function 442 remains in the group 430 that corresponds to the first category 420. The PF adjunct 416 may determine not to transfer the first virtual function 442 from the first group 430 to the first category 420 because the first virtual function 442 remains in the group 430 that corresponds to the first category 420. The PF adjunct 416 may determine that the second virtual function 443 was originally in the first category 420. The second virtual function 443 may be distributed from the first group 430 to the third group 432 that corresponds to the third category 422. The PF adjunct 416 may transfer the second virtual function 442 from the third group 432 to the third category 422 because the second virtual function 442 has been transferred to a different group that corresponds to a different category.

When a determination is made at 704 is that the virtual function is not being moved to a different category, the method proceeds to 710, and a determination may be made as to whether the virtual functions that have changed categories have been transferred from the groups to the categories. If the determination is made at 704 that all the virtual functions that have changed categories have not been transferred from the groups to the categories, the method may select another virtual function, at 712, and the method may proceed to 704. If the determination is made that all the virtual functions with changed categories have been transferred from the groups to the categories, the method may end, at 714.

In this manner, a PF adjunct may non-disruptively transfer virtual functions from groups to categories. A virtual function may be transferred from a group to a corresponding category when the group corresponding to the category has changed for the virtual function. Doing so may reduce a number of virtual functions to be transferred from the groups to the corresponding categories, thereby reducing a time to transfer the virtual functions from the groups to the corresponding categories. By transferring the virtual functions non-disruptively, the operation of the executing virtual functions is not disrupted, e.g., a reboot of a client application or of a logical partition is not performed during the transfer of the virtual functions to new categories.

Figure 8:
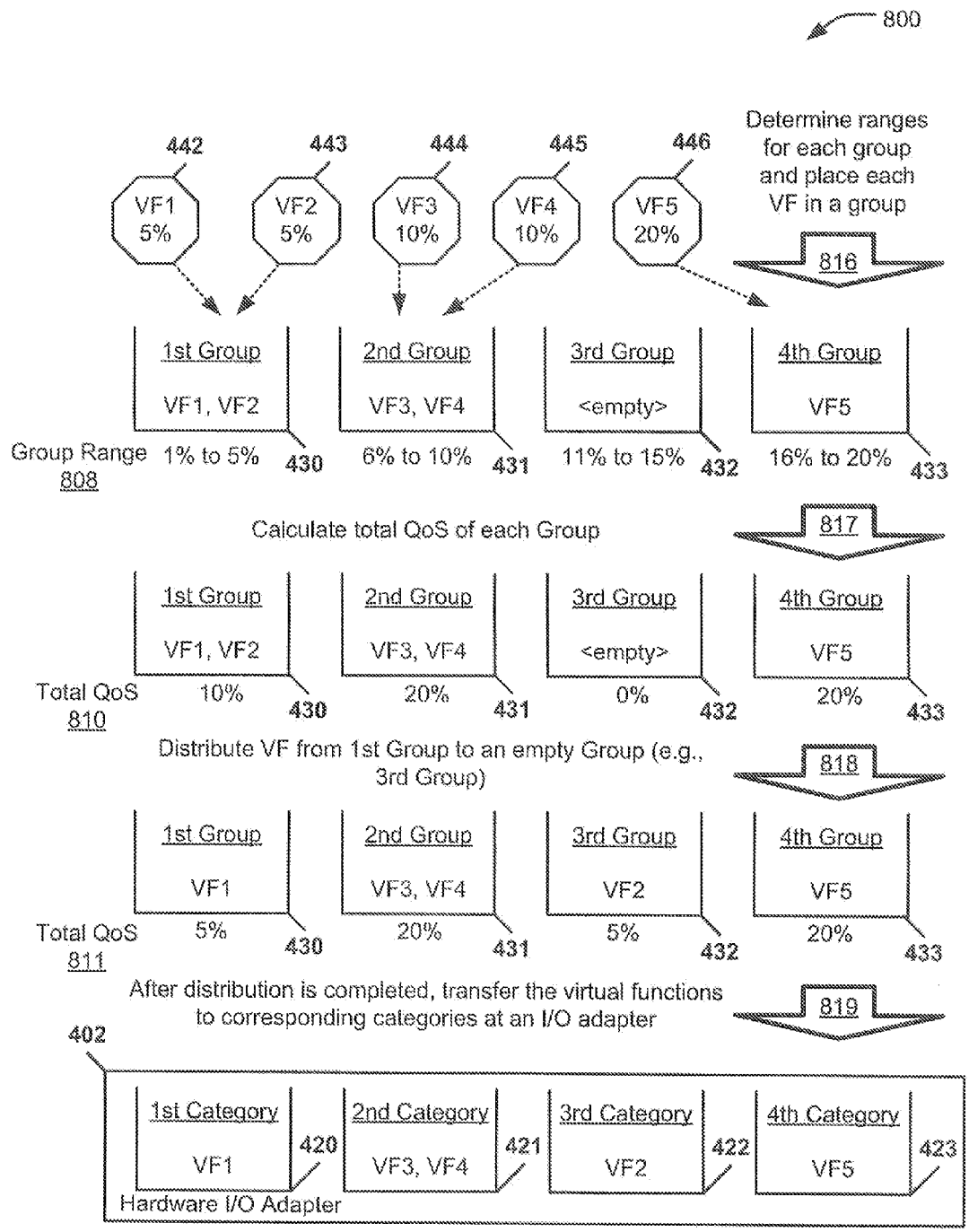
FIG. 8 is a block diagram of a fourth method to dynamically balance a parameter associated with one or more virtual functions.

Referring to FIG. 8, a flow diagram of a fourth method to dynamically balance a parameter associated with one or more virtual functions is depicted. The method may be performed by a physical function (PF) adjunct, such as the PF adjunct 220 of FIG. 2, the PF adjunct 318 of FIG. 3, and the PF adjunct 416 of FIG. 4. FIG. 8 illustrates how the PF adjunct 416 of FIG. 4 may group and distribute the virtual functions 442 among the groups 430-433.

At 816, the groups 430-433 corresponding to the categories 420-423 at the hardware input/output (I/O) adapter 402 may be created, ranges may be determined and assigned to the groups 430-433, and each of the virtual functions 442-446 may be placed in one of the groups 430-433 based on the ranges. Quality of service (QoS) allocations assigned to each of the virtual functions may be determined. In this example, five percent may be assigned to the first virtual function 442, five percent may be assigned to the second virtual function 443, ten percent may be assigned to the third virtual function 444, ten percent may be assigned to the fourth virtual function 445, and twenty percent may be assigned to the fifth virtual function 446. Group ranges 808 for the groups 430-433 may be calculated by subtracting the lowest allocation (e.g., five percent) from the highest allocation (e.g., twenty percent) adding one and then dividing by the number of categories (e.g., four). Thus, each range in this example covers (20−5+1)/4=4%. A first range of one percent to five percent may be assigned to the first group 430, and a second range of six percent to ten percent may be assigned to the second group 431. A third range of seven percent to fifteen percent may be assigned to the third group 432, and a fourth range of sixteen percent to twenty percent may be assigned to the fourth group 433.

The virtual functions 442-446 may be placed in the groups 430-433 based on the ranges assigned to each of the groups 430-433. In FIG. 8, the virtual functions 442, 443 are assigned to the first group 430 because their individual allocations of five percent fall within the first range (e.g., one percent to five percent) that is assigned to the first group 430. The virtual functions 444, 445 are assigned to the second group 430 because their individual allocations of ten percent fall within the second range (six percent to ten percent) that is assigned to the second group 431. The virtual function 446 may be assigned to the third group 432 because the allocation of twenty percent falls within the fourth range (sixteen percent to twenty percent) that is assigned to the second group 431.

At 817, a total QoS 810 may be calculated for each of the groups 430-433 by summing up the individual allocations of the virtual functions assigned to each of the groups 430-433. In FIG. 8, the total QoS 810 of the first group 430 may be ten percent (e.g., five percent plus five percent from the virtual functions 442-443), and the total QoS 810 of the second group 431 may be twenty percent (e.g., ten percent plus ten percent from the virtual functions 444-445). The total QoS 810 of the third group 432 may be zero percent, and the total QoS 810 of the fourth group 433 may be twenty percent (e.g., twenty percent from the fifth virtual function 433).

At 818, one or more of the virtual functions 442, 443 may be distributed from the first group 430 to the third group 432. The distribution may be performed because at least one group (e.g., the third group 432) may be empty, and at least one group has two or more virtual functions (e.g., the groups 430 and 431 each have two virtual functions). The first group 430 may be selected because it has a lower QoS range (e.g., one percent to five percent) than the second group 431 (e.g., six percent to ten percent). The first group 430 may be selected because the total QoS 810 of the first group 430 (e.g., ten percent) is less than the total QoS 810 of the second group 431 (e.g., twenty percent). The number of virtual functions to distribute from the first group 430 may be determined by dividing the number of virtual functions in the first group 430 by two. The second virtual function 443 may be distributed from the first group 430 to the third group 432.

The total QoS 811 for the groups 430-433 may be recalculated based on the distribution. For example, after distribution, the total QoS 811 of the first group 430 may be five percent (e.g., ten percent minus five percent), and the total QoS 811 of the second group 431 may be five percent (e.g., zero percent plus five percent). The iterative distribution process may be complete where all of the groups 430-433 have at least one virtual function. The method of FIG. 8, e.g., grouping and distributing the virtual functions 442-446, may be performed when: a new virtual function is added, when an existing virtual function is deleted, when the QoS assigned to one or more of the virtual functions 442-446 has changed, when requested by a client application, when requested by a hypervisor, when a particular event occurs, or any combination thereof. In this application, the terms distribute and redistribute may be used interchangeably due to the iterative nature of the distribution process.

At 819, the virtual functions 442-446 may be transferred from the groups 430-433 to the corresponding categories 420-423 at the hardware I/O adapter 402. In a particular embodiment, only those virtual functions that have changed to a different category may be transferred to the categories 420-423.

Figure 9:
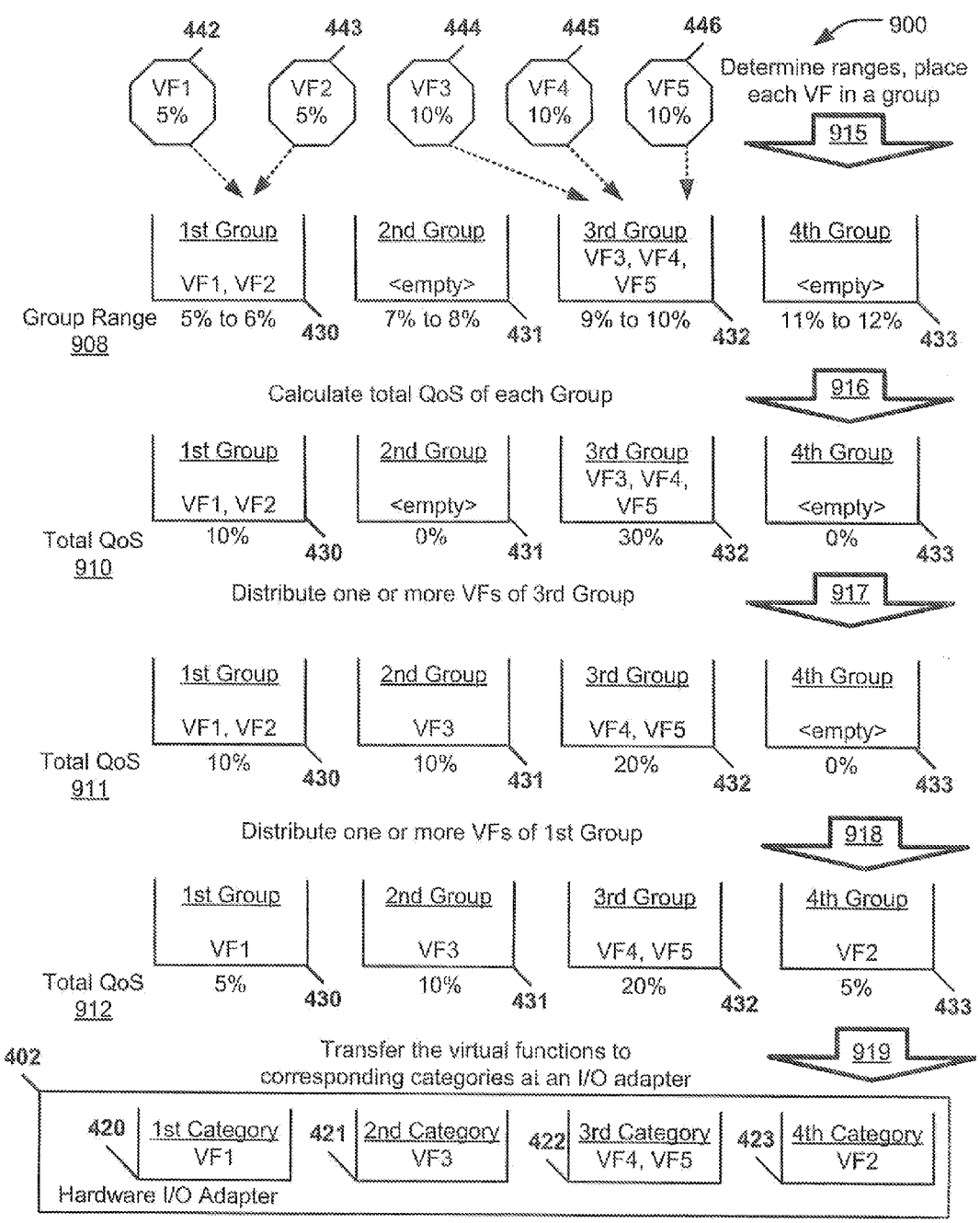
FIG. 9 is a block diagram of a fifth method to dynamically balance a parameter associated with one or more virtual functions.

Referring to FIG. 9, a flow diagram of a fifth method to dynamically balance a parameter associated with one or more virtual functions is depicted. The method may be performed by a physical function (PF) adjunct, such as the PF adjunct 220 of FIG. 2, the PF adjunct 318 of FIG. 3, and the PF adjunct 416 of FIG. 4. FIG. 9 illustrates how the PF adjunct 416 of FIG. 4 may group and distribute the virtual functions 442 among the groups 430.

At 915, the groups 430-433 corresponding to the categories 420-423 at the hardware input/output (I/O) adapter 402 may be created, ranges may be determined and assigned to the groups 430-433, and each of the virtual functions 442-446 may be placed in one of the groups 430-433. The groups 430-433 may be created at a memory device that is accessible to the PF adjunct 416. Quality of service (QoS) allocations assigned to each of the virtual functions may be determined. In this example, the PF adjunct may determine that five percent is assigned to each of the virtual functions 442-443, and ten percent is assigned to each of the virtual function 444-446. Group ranges 808 for the groups 430-433 may be calculated by subtracting the lowest allocation (e.g., five percent) from the highest allocation (e.g., ten percent), adding one, and then dividing by the number of categories (e.g., four). Thus, each range in this example covers (10−5+1)/4=1% (using integer division). A first range of five percent to six percent may be assigned to the first group 430, and a second range of seven percent to eight percent may be assigned to the second group 431. A third range of nine percent to ten percent may be assigned to the third group 432, and a fourth range of eleven percent to twelve percent may be assigned to the fourth group 433. The virtual functions 442-446 may be placed in the groups 430-433 based on the ranges assigned to each of the groups 430-433. In FIG. 9, the virtual functions 442-443 may be assigned to the first group 430 because their individual allocations of five percent fall within the first range (e.g., five percent to six percent) that is assigned to the first group 430. The virtual functions 444-446 are assigned to the third group 432 because their individual allocations of ten percent fall within the third range (nine percent to ten percent) that is assigned to the second group 431. The second group 431 and the fourth group 433 are empty.

At 916, a total QoS 910 may be calculated for each of the groups 430-433 by summing up the individual allocations of the virtual functions assigned to each of the groups 430-433. In FIG. 9, the total QoS 910 of the first group 430 may be ten percent (e.g., five percent plus five percent from the virtual functions 442-443), and the total QoS 810 of the third group 432 may be thirty percent (e.g., ten percent plus ten percent plus ten percent from the virtual functions 444-446). The total QoS 810 of the second group 431 may be zero percent, and the total QoS 810 of the fourth group 433 may be zero.

At 917, one or more of the virtual functions 442, 443 may be distributed from the third group 432 to one of the empty groups 431, 433. The distribution may be performed because at least one group (e.g., the groups 431, 433) are empty, and at least one group has two or more virtual functions (e.g., the groups 430, 432). The third group 432 may be selected because it has more virtual functions (e.g., three) than the first group 430. The third virtual function 444 may be distributed from the third group 432 to the second group 431. The total QoS 911 for the groups 430-433 may be recalculated based on the distribution. For example, after distribution, the total QoS 911 of the first group 430 may be ten percent, the total QoS 911 of the second group 431 may be ten percent, and the total QoS 911 of the third group 432 may be twenty percent. There may still be at least one empty group (e.g., group 433) and at least one group with more than one virtual example (e.g., the first group 430 has virtual functions 442, 443, and the third group 432 has virtual functions 445-446), so another distribution may be performed.

At 918, one or more of the virtual functions 442, 443 may be distributed from the first group 430 to the fourth group 433. Both the first group 430 and the third group 432 each have two virtual functions, so the virtual functions in either group 430, 432 may be selected for distribution. The first group 430 may be selected because the total QoS 911 of the first group 430 (e.g., ten percent) may be less than the total QoS 911 of the third group 432 (e.g., twenty percent). The second virtual function 443 may be distributed from the first group 430 to the fourth group 433. The total QoS for the groups 430-433 may be recalculated based on the distribution. For example, after distribution, the total QoS 912 of the first group 430 may be five percent, and the total QoS 912 of the second group 431 may be ten percent. The total QoS 912 of the third group 432 may be twenty percent, and the total QoS 912 of the fourth group may be five percent.

The distribution may be complete when all of the groups 430-433 have at least one virtual function. The entire method of grouping and distributing the virtual functions 442-446 may be performed: when a new virtual function is added, when an existing virtual function is deleted, when the QoS assigned to one or more of the virtual functions 442-446 has changed, when requested by a client application, when requested by a hypervisor, when a particular event occurs, or any combination thereof.

At 919, the virtual functions 442-446 may be transferred from the groups 430-433 to the corresponding categories 420-423 at the hardware I/O adapter 402. In a particular embodiment, only those virtual functions that have changed to a different category may be transferred to the categories 420-423.

Figure 10:
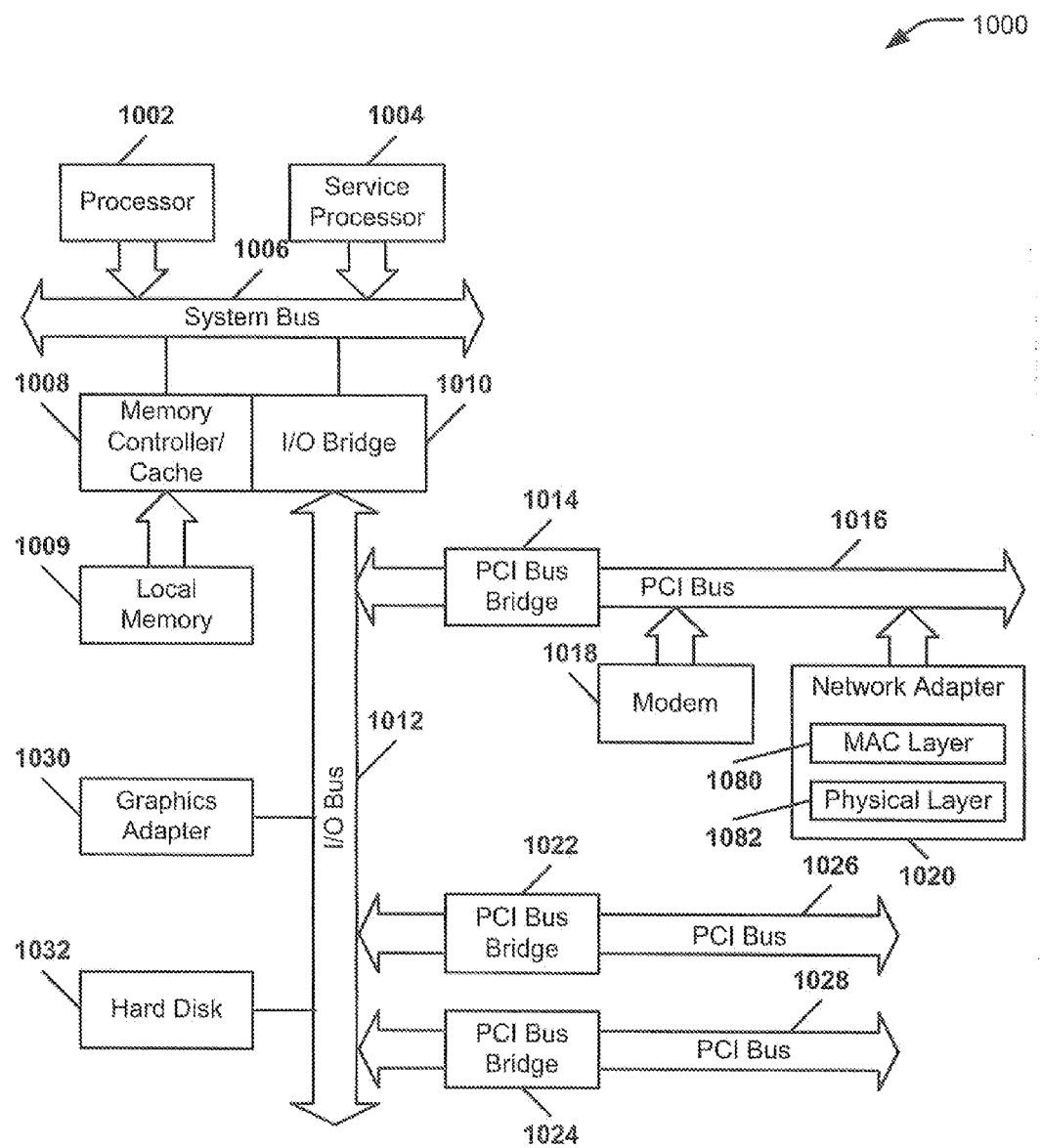
FIG. 10 is a block diagram of an illustrative embodiment of a general computer system configured to support the methods and systems of FIGS. 1-9.

Referring to FIG. 10, a block diagram of an illustrative embodiment of a general computer system is depicted and generally designated 1000. The computer system 1000 may be configured to execute and/or incorporate the methods and systems described in FIGS. 1-9. The computer system 1000 may be a symmetric multiprocessor (SMP) system that includes a plurality of shared processors or SMT-capable processors, such as processors 1002 and 1004 connected to system bus 1006. Alternatively, a single processor system may be employed. In the depicted example, processor 1004 may be a service processor. Each SMT-capable processor may be capable of concurrently executing multiple hardware threads on the one processor.

Connected to system bus 1006 may be memory controller/cache 1008, which provides an interface to local memory 1009. An I/O bus bridge 1010 may be connected to a system bus 1006 to provide an interface to I/O bus 1012. A memory controller/cache 1008 and an I/O bridge 1010 may be integrated as depicted.

A peripheral component interconnect (PCI) bus bridge 1014 connected to I/O bus 1012 may provide an interface to PCI local bus 1016. Multiple modems may be connected to PCI bus 1016. Typical PCI bus implementations may support PCI expansion slots or add-in connectors. Communications links to network computers may be provided via modem 1018 and network adapter 1020 connected to PCI local bus 1016 through add-in boards.

Network adapter 1020 may include a physical layer 1082 which enables analog signals to go out to a network, such as for example, an Ethernet network via an R45 connector. A media access controller (MAC) 1080 may be included within network adapter 1020. Media access controller (MAC) 1080 may be coupled to bus 1016 and processes digital network signals. MAC 1080 may serve as an interface between bus 1016 and physical layer 1082. MAC 1080 may perform a number of functions involved in the transmission and reception of data packets. For example, during the transmission of data, MAC 1080 may assemble the data to be transmitted into a packet that includes address and error detection fields. During the reception of a packet, MAC 1080 may disassemble the packet and perform address checking and error detection. In addition, MAC 1080 may perform encoding/decoding of digital signals prior to transmission, perform preamble generation/removal, and bit transmission/reception.

Additional PCI bus bridges 1022 and 1024 may provide interfaces for additional PCI buses 1026 and 1028, from which additional modems or network adapters may be supported. In this manner, data processing system 1000 may allow connections to multiple network computers. A memory-mapped graphics adapter 1030 and hard disk 1032 may be directly or indirectly connected to I/O bus 1012.

Service processor 1004 may interrogate system processors, memory components, and I/O bridges to generate and inventory the system 1000. Service processor 1004 may execute Built-In-Self-Tests (BISTs), Basic Assurance Tests (BATs), and memory tests on one or more of the elements in the system 1000. Any error information for failures detected during the BISTs, BATs, and memory tests may be gathered and reported by service processor 1004.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A computer-implemented method, comprising:
    identifying bandwidth allocations respectively assigned to a plurality of virtual functions that are provided via a hardware input/output adapter in a virtualized computing system, wherein the hardware input/output adapter supports classification of the plurality of virtual functions into a plurality of categories, each category of the plurality of categories representing a different priority level of input/output processing;
    determining a bandwidth range associated with each group of a plurality of groups based on a highest of the assigned bandwidth allocations, a lowest of the assigned bandwidth allocations, and the number of groups, wherein the number of groups is equal to the number of the plurality of categories, wherein each group corresponds to a respective one of the categories, wherein the bandwidth range associated with each particular group of the plurality of groups is greater than the bandwidth range associated with each group corresponding to a lower priority category than the category corresponding to the particular group, and wherein the bandwidth ranges do not overlap;
    assigning each virtual function of the plurality of virtual functions to one of the groups, wherein the bandwidth allocation assigned to the virtual function is within the bandwidth range of the group to which the virtual function is assigned;
    after assigning each virtual function, in response to determining that a first group of the plurality of groups is empty and that a second group of the plurality of groups has two or more virtual functions, redistributing the two or more virtual functions between the second group and the first group, wherein after the redistributing, the first group and the second group each has at least one virtual function, and wherein the second group is associated with a lower bandwidth range than the first group; and
    after the redistributing, transferring the plurality of virtual functions from each group of the plurality of groups to the category corresponding to the group at the hardware input/output adapter for processing.

2. The computer-implemented method of claim 1, further comprising determining a number of virtual functions to redistribute based on a parameter from the second group to the first group before redistributing the two or more virtual functions from the second group to the first group.

3. The computer-implemented method of claim 2, wherein determining the number of virtual functions to redistribute from the second group to the first group comprises dividing the number of virtual functions associated with the second group by two.

4. The computer-implemented method of claim 1, further comprising:
    determining that a third group of the plurality of groups is empty;
    determining that a fourth group of the plurality of groups has two or more virtual functions; and
    redistributing the two or more virtual functions from the fourth group to the third group.

5. The computer-implemented method of claim 4, further comprising determining a total of the assigned bandwidth allocations for each group of the plurality of groups.

6. The computer-implemented method of claim 2, wherein the parameter comprises a quality of service parameter.

7. The computer-implemented method of claim 2, wherein the parameter comprises a number of queues parameter.

8. The computer-implemented method of claim 2, wherein the parameter comprises a number of interrupts parameter.

9. An apparatus, comprising:
    a processor;
    a hardware input/output adapter configured to support classification of a plurality of virtual functions into a plurality of categories, wherein each category of the plurality of categories represents a different priority level of input/output processing; and
    a memory to store program code, the program code executable by the processor to implement a virtualized computing system and:
        to identify a bandwidth allocation respectfully assigned to each virtual function of a plurality of virtual functions that are provided via the hardware input/output adapter,
        to determine a bandwidth range associated with each group of a plurality of groups based on a highest of the assigned bandwidth allocations, a lowest of the assigned bandwidth allocations, and the number of groups, wherein the number of groups is equal to the number of the plurality of categories, wherein each group corresponds to a respective one of the categories, wherein the bandwidth range associated with each particular group of the plurality of groups is greater than the bandwidth range associated with each group corresponding to a lower priority category than the category corresponding to the particular group, and wherein the bandwidth ranges do not overlap,
        to assign each virtual function of the plurality of virtual functions to one of the groups, wherein the bandwidth allocation assigned to the virtual function is within the bandwidth range of the group to which the virtual function is assigned, after the assigning of each virtual function, in response to determining that a first group of the plurality of groups is empty and that a second group of the plurality of groups has two or more virtual functions, to redistribute the two or more virtual functions between the second group and the first group such that the first group and the second group each has at least one virtual function, wherein the second group is associated with a lower bandwidth range than the first group, and after the redistributing, to transfer the plurality of virtual functions from each group of the plurality of groups to the category corresponding to the group at the hardware input/output adapter for processing.

10. The apparatus of claim 9, wherein the program code is further executable by the processor to determine a number of virtual functions to redistribute based on a parameter from the second group to the first group before redistributing the two or more virtual functions from the second group to the first group.

11. The apparatus of claim 10, wherein the program code to determine the number of virtual functions to redistribute from the second group to the first group is executable by the processor to divide the number of virtual functions associated with the second group by two.

12. The apparatus of claim 9, wherein the program code is further executable by the processor to:

determine that a third group of the plurality of groups is empty;

determine that a fourth group of the plurality of groups has two or more virtual functions; and redistribute the two or more virtual functions from the fourth group to the third group.

13. The apparatus of claim 12, wherein the program code is further executable by the processor to determine a total of the assigned bandwidth allocations for each group of the plurality of groups.

14. The apparatus of claim 10, wherein the parameter comprises a quality of service parameter.

15. The apparatus of claim 10, wherein the parameter comprises a number of queues parameter.

16. The apparatus of claim 10, wherein the parameter comprises a number of interrupts parameter.

17. A computer program product comprising a non-transitory computer usable medium having computer usable program code embodied therewith, the computer usable program code executable by a processor to:

identify a bandwidth allocation respectively assigned to a plurality of virtual functions that are provided via a hardware input/output adapter in a virtualized computing system, wherein the hardware input/output adapter supports classification of the plurality of virtual functions into a plurality of categories, each categories of the plurality of categories representing a different priority level of input/output processing;

determine a bandwidth range associated with each group of a plurality of groups based on a highest of the assigned bandwidth allocations, a lowest of the assigned bandwidth allocations, and the number of groups, wherein the number of groups is equal to the number of the plurality of categories, wherein each group corresponds to a respective one of the categories, wherein the bandwidth range associated with each particular group of the plurality of groups is greater than the bandwidth range associated with each group corresponding to a lower priority category than the category corresponding to the particular group, and wherein the bandwidth ranges do not overlap;

assign each virtual function of the plurality of functions to one of the groups, wherein the bandwidth allocation assigned to each virtual function is within the bandwidth range of the group to which each virtual function is assigned;

after the assigning of each virtual function and upon determining that a first group of the plurality of groups is empty and that a second group of the plurality of groups has two or more virtual functions, redistribute the two or more virtual functions between the second group and the first group such that the first group and the second group each has at least one virtual function, and wherein the second group is associated with a lower bandwidth range than the first group; and after the redistributing, transfer the plurality of virtual functions from each group of the plurality of groups to the category corresponding to the group at the hardware input/output adapter for processing.

18. The computer program product of claim 17, wherein the computer usable program code is further executable by the processor to determine a number of virtual functions to redistribute from the second group to the first group.

* * * * *